United States Patent [19]
Blosnich

[11] Patent Number: 4,721,037
[45] Date of Patent: Jan. 26, 1988

[54] SMOKER APPARATUS FOR AN OUTDOOR BARBECUE GRILL

[76] Inventor: John J. Blosnich, 134 Millsboro Rd., Rices Landing, Pa. 15357

[21] Appl. No.: 947,393

[22] Filed: Dec. 29, 1986

[51] Int. Cl.$^4$ ........................ A47J 37/07; A47J 37/04
[52] U.S. Cl. .................................... 99/482; 99/352; 99/467; 99/481; 126/25 R; 126/41 R
[58] Field of Search ............... 99/352, 446, 447, 467, 99/481, 482; 126/9 R, 25 R, 25 A, 41 R

[56] References Cited

U.S. PATENT DOCUMENTS

| | | | |
|---|---|---|---|
| 1,837,924 | 12/1931 | Rutherford | 99/352 |
| 2,833,201 | 5/1958 | Simank | 99/481 |
| 3,786,741 | 1/1974 | Plumley et al. | 99/447 |
| 4,355,570 | 10/1982 | Martin et al. | 99/482 X |
| 4,467,709 | 8/1984 | Anstedt | 99/482 |
| 4,495,860 | 1/1985 | Hitch et al. | 99/482 X |
| 4,512,249 | 4/1985 | Mentzel | 126/25 R X |
| 4,643,162 | 2/1987 | Collins | 126/41 R |
| 4,664,026 | 5/1987 | Milloy | 99/352 |

*Primary Examiner*—John Petrakes
*Attorney, Agent, or Firm*—Henderson & Sturm

[57] ABSTRACT

An apparatus for cooking foods which is a combination of an outdoor grill and an optional smoker attachment. The grill itself is of a type having a container with an open top, a closed bottom, front and rear sidewalls for holding heat-retaining lava rock. A hinged lid which is removable is attached to the grill for retaining heat within the container. A removable grate is selectively disposed inside of the container above the lava rock when the device is to be used as a grill for holding foods directly up above the lava rock and such grate is removable when the device is to be used for smoking foods. When the apparatus is to be used as a smoker, a metal cabinet having a rear wall, a pair of sidewalls connected to the rear wall, a removable front wall and a top wall is placed upon the container and has an open bottom so that the heat from the lava rock will be trapped within such metal cabinet. A tray is disposed just above the lava rock for holding wood chips which will generate smoke for flavoring the food being smoked. Slots on the rear wall of the metal cabinet and hooks on the sidewall are are provided for holding the metal cabinet onto the grill in a proper position. A plurality of grates are positioned in an upper part of the metal cabinet for holding foods during the smoking process. An optional small door is provided in the front wall of the cabinet for inserting additional wood chips as might be necessary, without losing the majority of the smoke within the cabinet.

2 Claims, 5 Drawing Figures

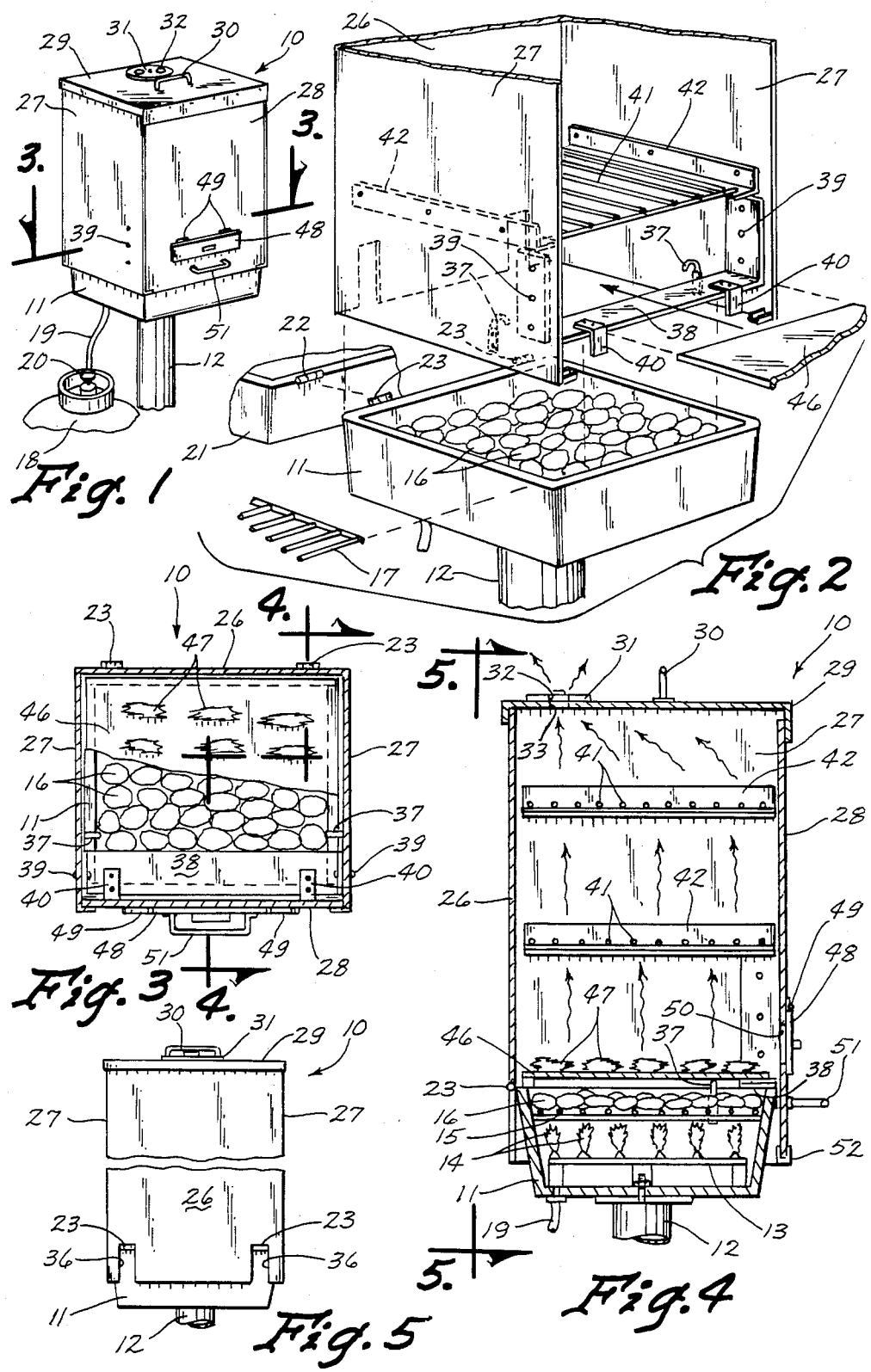

SMOKER APPARATUS FOR AN OUTDOOR BARBECUE GRILL

TECHNICAL FIELD

The present invention relates generally to a smoker for smoking meats and other foods and more particularly to such a smoker which is used in combination with a conventional outdoor barbecue grill or the like.

BACKGROUND ART

Barbecue grills are in common usage in the backyards and decks of homes throughout the United States. These grills typically use charcoal which is lighted or lava rock for holding the heat supplied by a gas burner or an electric heating element. There are many foods which can be prepared on such an outdoor grill.

Another category of outdoor food preparation devices are smokers which are generally devices having an enclosed chamber with trays therein for holding meats or other foods, a heat source at the bottom thereof and wood chips which produce smoke when sufficiently heated. The heat and smoke will cook food and impart the smokey flavor from the smoke within the container to the foods.

So in order to grill certain foods, an outdoor barbecue grill is necessary, while if the food is desired to be smoked, a smoker apparatus is needed. In having two separate devices, a grill and a smoker, two separate structures for heating must be provided whereas it would be desirable to have a combination grill and smoker for which only one heating apparatus is used, thereby saving considerable expense and maintenance.

U.S. Pat. No. 3,786,741 discloses a combination smoking and grilling apparatus. The problem with this device is that much of the heat and smoke is lost around the side of the grill when it is used for smoking foods. There is consequently a need for a combination grill and smoking apparatus which will not waste such heat and smoke when used for smoking foods while at the same time permitting the user to use the device either as a grill for grilling foods, or as a smoker for smoking foods.

DISCLOSURE OF THE INVENTION

The present invention relates to an apparatus for cooking foods which is a combination of an outdoor grill and an optional smoker attachment. The grill itself is of a type having a container with an open top, a closed bottom, front and rear sidewalls for holding heat-retaining lava rock. A hinged lid which is removable is attached to the grill for retaining heat within the container. A removable grate is selectively disposed inside of the container above the lava rock when the device is to be used as a grill for holding foods directly up above the lava rock and such grate is removable when the device is to be used for smoking foods. When the apparatus is to be used as a smoker, a metal cabinet having a rear wall, a pair of sidewalls connected to the rear wall, a removable front wall and a top wall is placed upon the container and has an open bottom so that the heat from the lava rock will be trapped within such metal cabinet. A tray is disposed just above the lava rock for holding wood chips which will generate smoke for flavoring the food being smoked. Slots on the rear wall of the metal cabinet and hooks on the sidewall are provided for holding the metal cabinet onto the grill in a proper position. A plurality of grates are positioned in an upper part of the metal cabinet for holding foods during the smoking process. An optional small door is provided in the front wall of the cabinet for inserting additional wood chips as might be necessary, without losing the majority of the smoke within the cabinet.

An object of the present invention is to provide an improved combination barbecue grill and smoker.

Another object is to provide a food smoking attachment for use in combination with a standard outdoor barbecue grill.

Other objects, advantages, and novel features of the present invention will become apparent from the following detailed description of the invention when considered in conjunction with the accompanying drawings.

BRIEF DESCRIPTION OF THE DRAWINGS

FIG. 1 is a perspective view of a combination outdoor barbecue grill using bottled gas as a heating source and a smoker attachment disposed thereon;

FIG. 2 is an enlarged exploded perspective view of various parts of the apparatus shown in FIG. 1;

FIG. 3 is a cross sectional view taken along line 3—3 of FIG. 1;

FIG. 4 is a cross sectional view taken along line 4—4 of FIG. 3; and

FIG. 5 is a rear view taken along line 5—5 of FIG. 4.

BEST MODE FOR CARRYING OUT THE INVENTION

Referring now to the drawings wherein like reference numerals designate identical or corresponding parts throughout the several views, FIG. 1 shows a combination grill and smoker (10) constructed in accordance with the present invention.

Referring to FIGS. 2 and 4, it is noted that a container (11) is generally sealed except at the top thereof and can be supported off the ground by a post (12). This container (11) can have a heat source which is either electric or gas, for example, but the preferred embodiment shown in the drawings is a gas model having burners (13) which produce a gas flame (14) when the grill is in operation. A grate (15) is held in the position shown in FIG. 4 because of its size and because of the tapered nature of the sidewalls of the container (11).

Lava rock (16) is positioned across the top of the grate (15) in a conventional fashion so that when the burner (13) is utilized, the lava rock will retain the heat from the flame (14) and will evenly grill meat or other foods placed on a grate (17), which is optionally shown in FIG. 2.

Referring to FIG. 1, it is noted that a tank (18) of propane or other liquid gas has a supply hose (19) attached thereto and a control valve (20) attached to the tank. Other control valves, not shown, can be placed on the grill structure itself if desired. The container (11) has a lid (21) which can be attached to the container (11) by hinge members (22) and (23) or the lid (21) can be removed from the container (11) when the smoker attachment is to be used instead of the grill (17).

FIG. 4 shows the grill (17) and lid (21) removed from the container (11) and the smoker attachment in use. The smoker attachment includes a cabinet having a rear wall (26), sidewalls (27), a removable front wall (28) and a top (29) riveted to sidewalls (27). The top (29) has a handle (30) thereon for facilitating removal or placement of the smoker on or off of the container (11). The top wall (29) also has an optional rotatable plate (31) with openings (32) therein which can be aligned with openings (33) in the top wall (29) if it is desired to vent air out of the metal cabinet.

Slots (36) in the rear wall (26) of the metal cabinet hold the back end of the metal cabinet in place on top of the grill container (11) while the front and sides of the metal cabinet are held in place by hooks (37) attached to the sidewalls (27) of the metal cabinet and which fit over the top side lips of the container (11). Additionally, a metal flange (38) is riveted to the sides (27) of the metal cabinet by rivets (39) and this flange (38) fits directly on top of the front lip of the container (11). Flanges (40), which are riveted to the flange (38), extend over the front of the top lip of the container (11) to further stabilize the metal cabinet as it sets on top of the grill container (11).

Grates (41) are held in place by L-shaped brackets (42) riveted to the sides (27) of the metal cabinet. Metal tray (46), shown in FIG. 4, is disposed within the metal cabinet and above the lava rock (16) for holding wood chips, such as hickory wood chips.

An optional door (48) is pivoted by hinge (49) for covering up an opening (50) through the door (28). A handle (51) is attached to the front wall (28) for allowing the front wall (28) to be removed and easily replaced in order to gain access to the interior of the metal cabinet. U-shaped brackets (52) are rigidly attached to each of the sidewalls (27) for holding the front wall (28) in the position shown in FIG. 4 when it is in use smoking foods.

In operation, when a person desires to use the apparatus shown in FIG. 2 as a grill, the metal cabinet above the container (11) is removed, and the grill (17) is placed over the lava rock (47). Additionally, the lid (21) can be attached to the container (11) and pivoted over the grate (17) when desired, or pivoted back out of the way when desired. In this grilling mode, steaks or hamburgers can be grilled in a conventional fashion or, with the lid (21) down over the container (11), roasts or the like can be baked.

When the apparatus (10) is used with the smoker attachment thereon, for example as shown in FIG. 4, then meat or other foods are placed on the grates (41) by first grasping the handle (51) and lifting the front wall upwardly off of the brackets (52) and then pulling the lower portion of the front wall (28) outwardly and downwardly to clear the top front edge of the upper wall or cover (29). At that time, the burner (13) can be lit, the food placed on the grates (41) and wood chips (47) are placed in the position shown in FIG. 4 on the tray (46). After that is done, the front panel (28) would be replaced by a reverse of the above described procedure for removing it from the metal cabinet. At that time, the food on the grates (41) can be slowly smoked. If at some time during the smoking process more woods chips (47) are needed in order to provide adequate smoke within the metal cabinet, the door (48) can be pivoted open without losing all of the smoke within the metal cabinet and wood chips (47) can be placed therein and the door (48) closed again.

Obviously many modifications and variations of the above invention are possible in light of the above teachings. It is therefore to be understood that, within the scope of the appended claims, the invention may be practiced otherwise than as specifically described.

I claim:

1. A combination smoker attachment and grill comprising:

container means having an open top, a closed bottom, front and rear sidewalls for holding heat retaining lava rock;

hinge means for selectively attaching or detaching a pivoting lid onto said container means, said hinge means comprising a pair of members extending rearwardly from the top and rear of said rear sidewalls;

a grate;

means attached to said container means for selectively holding said grate near said open top thereof above said rock, and permitting said grate to be removed from said container means;

means attached to said container means for selectively heating said lava rock;

a metal cabinet having a rear wall, a pair of sidewalls connected to said rear wall, a removable front wall and a top wall;

a tray means for holding wood chips disposed above said lava rock;

means attached to a lower portion of said cabinet means for holding said cabinet onto the top and covering said container means;

a plurality of grates disposed above said metal tray means and attached to said container means for holding food to be smoked.

2. The combination smoker attachment and grille of claim 1 including a small door operatively attached to said front wall for inserting wood chips onto said tray means without letting too much smoke and heat out of said container means.

* * * * *